Aug. 1, 1967 J. A. BENDER 3,333,527
DRIP BREW MAKER WITH DISPLAY VALVE
Filed Dec. 14, 1964 2 Sheets-Sheet 1

INVENTOR
JOSEPH A. BENDER
BY
ATTORNEYS

Aug. 1, 1967   J. A. BENDER   3,333,527
DRIP BREW MAKER WITH DISPLAY VALVE
Filed Dec. 14, 1964   2 Sheets-Sheet 2
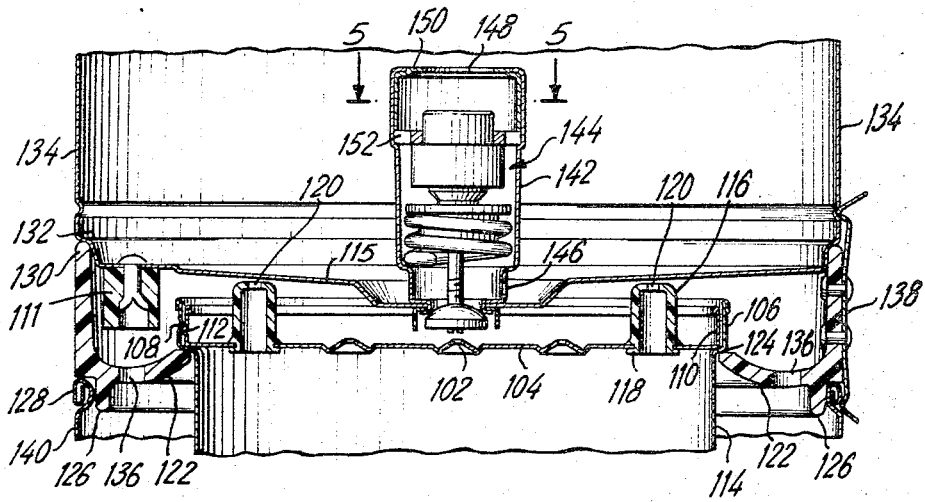
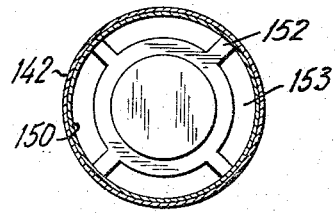
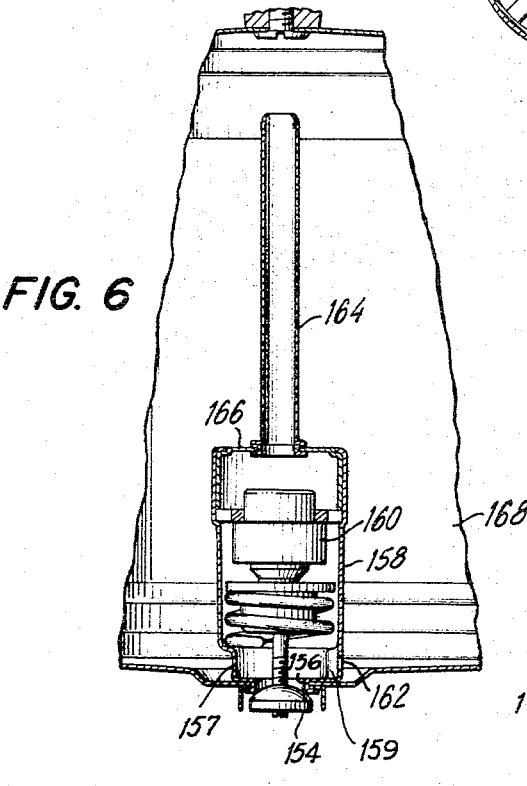
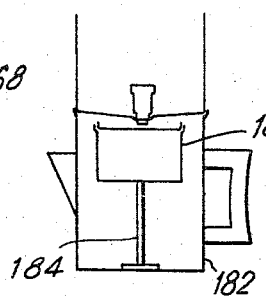
INVENTOR
JOSEPH A. BENDER
BY *James and Franklin*
ATTORNEYS United States Patent Office 3,333,527
Patented Aug. 1, 1967

3,333,527
DRIP BREW MAKER WITH DELAY VALVE
Joseph A. Bender, Springfield, N.J., assignor to Vacuum Die Casting Corp., Newark, N.J., a corporation of Ohio
Filed Dec. 14, 1964, Ser. No. 418,211
10 Claims. (Cl. 99—283)

ABSTRACT OF THE DISCLOSURE

The drip brew maker has a small flow rate control orifice effective for small quantities of water, and an additional passage at a higher level to greatly accelerate the flow of water for larger quantities of water. A thermally actuated valve is provided which controls flow from both the orifice and the accelerating passage simultaneously. Heat insulation means may be provided around the thermally responsive means to cause a delay, regardless of high temperature, in order to provide time for measurement of the hot water being poured into the reservoir.

---

This invention relates to brew makers, and more particularly to brew makers of the drip type.

Experts in the art of brewing coffee, among them the scientists of The Coffee Brewing Institute, Inc., in New York city, emphasize that the best quality coffee is obtained by proper proportion between coffee and water, correct water temperature, and correct brewing time.

The temperature of the water in contact with the coffee grounds should be between 185° to 203° F. The best brewing time is a function of the fineness of the coffee grounds, rather than the quantity of the brew. During the initial brewing period, most of the desirable elements are extracted from the coffee grounds, but once this initial period has elapsed the extraction of desirable elements diminishes rapidly, and from that point on mostly undesirable bitter elements are transferred to the brew. The Coffee Brewing Institute, Inc., has established optimum brewing times for the various grinds of coffee, including a range of four to six minutes for the drip grind. (For fine grind, it would be one to three minutes; and for regular grind, it would be six to eight minutes.)

In my copending application Ser. No. 418,210 filed concurrently herewith, I disclose a drip coffee process which satisfies the basic rules of good brewing practice. More specifically, it provides a flow rate from the reservoir which is independent of the flow rate through the coffee bed; it distributes water over the basket to avoid channeling; it confines the coffee grounds to prevent floating particles from entering the finished brew; and it disposes of excess hot water which is not capable of going through the spreader and basket within the desired brewing time, the excess water being bypassed directly to the brew receiver. The basket is provided with a spreader; the basket is dimensioned to have a volume of from 1.6 to 2.5 times the volume of the maximum dry coffee charge; the spreader is preferably locked in the basket; and the basket and spreader combination are vented for release of gases.

The coffee maker then comprises a reservoir to supply hot water; a basket and spreader of appropriate design to contain the ground coffee; a server to receive the brew; and means to so control the rate of flow of hot water from the reservoir that the extraction time is correct independently of the ability of the basket to accept all of the water. The flow time is determined by a flow control orifice, and takes into account the time required for drainage of the basket.

When using my earlier drip coffee maker it is contemplated that a previously measured quantity of hot water be poured into the water reservoir. It is more convenient to provide a measuring scale on the reservoir for a direct measurement of hot water as it is being poured into the reservoir. In another copending application Ser. No. 418,175, filed concurrently herewith, I provide a manually removable stopper to stopper the flow discharge hole from the reservoir. The object of the present invention is to generally improve the coffee maker there disclosed.

A more particular object is to provide an automatically operated delay valve which is closed while pouring hot water into the reservoir, thus facilitating accurate measurement, and which then automatically opens to begin the brewing operation.

In said copending application I arrange for the brewing of a wide range of quantity, say from one-third of maximum to maximum (e.g. three to nine cups), while limiting the extraction time despite the wide range in quantity. This is done by the provision of an additional flow passage located at higher level in the reservoir, and therefore effective to accelerate the flow for larger quantities of water. A further object of the present invention is to retain the advantage of a broadened range, while using an automatically operated delay valve, the valve being made operative against the multiple level passages which are used for a wide capacity range.

To accomplish the foregoing general objects, and other more specific objects which will hereinafter appear, my invention resides in the drip coffee maker elements and their relation one to another, as are hereinafter more particularly described in the following specification. The specification is accompanied by drawings in which:

FIG. 4 is a vertical section like FIG. 2, but showing a different construction;

FIG. 5 is a fragmentary horizontal section taken in the plane of the line 5—5 of FIG. 4;

FIG. 6 is a fragmentary vertical section explanatory of still another form of the invention;

FIG. 7 shows the vent tube of FIG. 6, but modified to provide a multiple level flow control orifice; and FIG. 8 shows another type of basket support.

Figure 1:
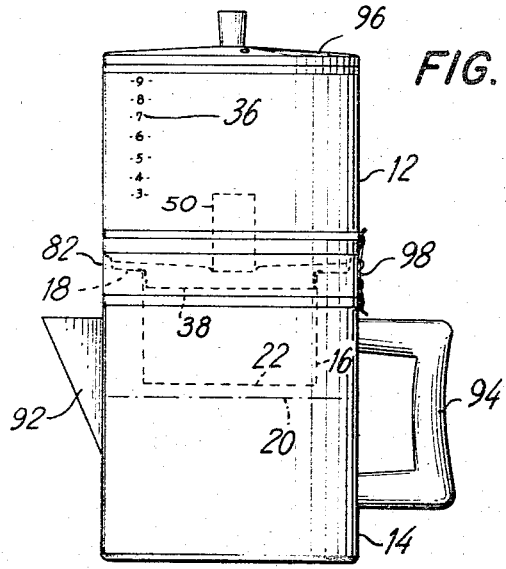
FIG. 1 is an elevation of a drip coffee maker embodying features of my invention.

Referring to the drawing, and more particularly to FIG. 1, the coffee maker comprises a reservoir 12 for hot water, a coffee server 14 therebeneath, and a coffee basket 16 between the reservoir 12 and the server 14. The basket 16 is supported by an annular support 18 which is outside the periphery of the basket, and this annular support has overflow holes for overflow outside the basket 16 to the server 14. In the preferred form here shown, the basket 16 is smaller in diameter than the server 14, and the annular support 18 extends between the periphery of the basket and the periphery of the server. The maximum brew level, suggested at broken line 20, is kept below the bottom 22 of the basket.

Figure 2:
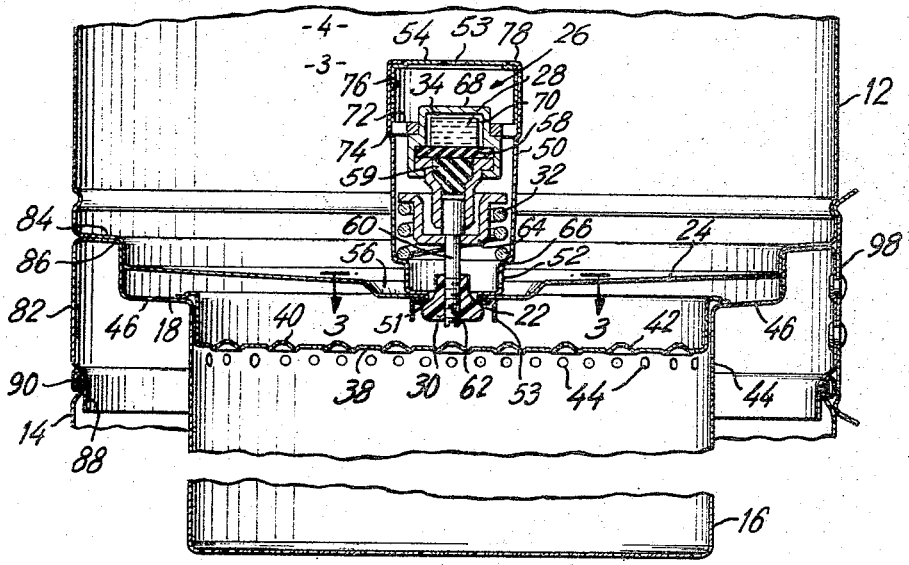
FIG. 2 is a fragmentary vertical section drawn to enlarged scale.

Referring now to FIG. 2, the reservoir 12 has a full bottom 24, except for a water discharge hole 22 which, in the earlier coffee maker of Ser. No. 418,210, was dimensioned to function also as a flow rate control orifice, but which in the present coffee maker is large in dimension and is used for free unrestricted flow.

In accordance with a main feature of the present invention, the reservoir 12 and hole 22 are provided with a delay valve, generally designated 26, which includes thermally responsive means 28 to open the valve plug 30 after a short delay. The particular valve here shown includes resilient means 32 which closes the valve at room temperature, while the thermally responsive means 28 opens the valve after a delay of about a half minute when subjected to an elevated temperature. The thermally responsive means 28 may be lined with or enclosed in heat insulation means 34 to cause the desired delay.

The reservoir 12 has a scale to indicate the quantity of hot water in the reservoir, for convenient measurement while the valve is still closed. The particular coffee maker here shown is intended to brew from three to nine cups, and the lower end of the scale for this purpose is indicated by the numerals "3," "4," in FIG. 3, the numerals being appropriately embossed or engraved on the interior of the reservoir. The presence of such a scale is also suggested at 36 in FIG. 1, but it will be understood that if the numerals are intended to be read on the inside of the reservoir they are appropriately reversed (mirror image).

Because the hot water is discharged from a single hole 22 (FIG. 2), instead of a large number of minute holes in the bottom of the reservoir, it is desirable to use a spreader 38 to ensure thorough distribution of the hot water through the coffee bed, as well as to prevent escape of coffee grounds. Spreader 38 has a large number of small holes 40 dimensioned to confine the coffee grounds. These are preferably formed in miniature inverted funnels 42, so that surface tension on the underside of the funnels encourages the formation of drops and facilitates instead of obstructing water passage through the fine holes. Back pressure inhibits the formation of drops, and therefore venting is important. The number of holes 40 is made sufficient to accommodate the initial flow from the reservoir at the start of the brewing cycle, with minimum water load in the reservoir. Any excess water at a faster flow rate to the spreader 38 collects above the spreader, and freely bypasses the basket and the coffee therein by flow through the overflow holes 46 directly into the server 14.

Gases are generated by the extraction process, and free venting of such gases may be obstructed when there is a body of water overlying the spreader. The basket and spreader combination is accordingly arranged for venting, and in FIG. 2 there is a line of small vent holes 44 through the side wall near the top of the basket. These are located well above the coffee bed resting on the bottom of the basket. The bottom has a large number of fine holes acting as a filter, or alternatively may have large holes supporting a filter disc made of paper or other expendable material.

Another feature of the coffee maker is its ability to accommodate a wide capacity range. In my limited-quantity-range coffee maker in which the discharge hole is dimensioned to act also as a flow control orifice, the flow provides a discharge time for discharge of all of the hot water from the reservoir, which time when added to the residual basket drain time, comes within the range of optimum extraction time for the grind being used. This is done regardless of any slower rate of flow through the basket, the excess water then bypassing the basket, and for this purpose the overflow holes 46 in the annular support 18 (FIG. 2) are most important.

The basket 16 preferably is so dimensioned and designed in respect to its perforations or permeability that the coffee grounds are flooded. For the present purpose I find it desirable to provide a basket having a volume in a range of from 1.6 to 2.0 times the dry volume of the maximum coffee charge contemplated to be used in the basket. This is for fine grind. For drip grind this desirably may be increased to say 2 to 2.5 times the dry volume, because of a tendency to sometimes foam. The coffee grounds swell about fifty percent in volume when wet. The entire range of from 1.6 to 2.5 is usable for both grinds. The smaller basket aids compactness.

Assuming the coffee is drip ground, the extraction time should be from five to seven minutes, but that includes an allowance for residual basket drain time and for drip time. The main basket drain time is about one-half minute, but increases when using softened water, as is common in the southwestern and western parts of the U.S. The drain time may increase to one minute or possibly to one and one-half minutes as a maximum. This main drain is followed by a final drip which is slow but accomplishes only reduced extraction because the liquid level is lower than the coffee level. The optimum extraction time referred to herein is that which removes 18% to 22% by weight from the ground coffee.

The brewed coffee is not weakened by the bypass overflow because the percentage of solids extracted from the ground coffee is a function of time. When the quantity of hot water is increased, the amount of coffee grounds put in the basket by the housewife is correspondingly increased, and therefore the amount of solids extracted is commensurately increased for the same extraction time. The bypassed water therefore merely restores the originally desired percentage content of solids.

A single flow control orifice will accomplish the desired limited extraction time for only a limited range of quantity. Referring now to FIG. 2, the valve 26 is housed in a can or tube 50 which surrounds the large discharge hole or valve seat 22. An orifice 52 is provided in the side of tube 50 at the bottom of the reservoir, and is appropriately dimensioned to properly control the flow rate for smaller quantities of water, say one third of maximum capacity. An additional passage, in this case another hole 53, is located at a higher level, and is effective to accelerate the flow for larger quantities of water, say from one-third of maximum to maximum capacity. The additional passage 53 could be formed in the side of tube 50, but inasmuch as the tube may be terminated or topped conveniently at the three-cup level, it is easy to form the accelerating passage 53 in the top 54, as shown. The overall time for discharge of hot water from the reservoir then is kept within the desired extraction time over a wide range, say from one-third of maximum to maximum, or in this particular case, from three to nine cups.

It may be noted that the bottom 24 of the reservoir is preferably depressed to form a small sump area 56 which facilitates full drainage through the lower orifice 52. The tube or housing 50 is preferably Teflon coated to guard against accumulation of scale which might reduce the size of orifice 52. The lower edge of the tube 50 may be reversely formed at 51 to anchor it on sump area 56, and also to hold a cylindrical shield 53 which protects the valve plug 30.

Considering the valve in greater detail, the thermomotive device here shown is sold under the name Vernatherm by the Controls Division (Detroit, Mich.) of American Radiator and Standard Sanitary Corp. This contains a quantity of an expandable wax-like material at 28. This material changes phase from solid to liquid and expands greatly when heated. The expansion urges a flexible diaphragm 58 downward, and with a flexible plug 59, which bears against a steel valve stem 60. The valve stem carries the valve plug 30, and the operation of the valve may be adjusted by means of a screw connection shown at 62, there being clearance between the top of stem 60 and the bottom of plug 59. The valve stem is shouldered and urged upward by a compression spring 32, the upper end of which bears against the flanged periphery of a cup-shaped washer 64. The lower end of the spring rests on an inwardly stepped ledge 66. The valve plug is preferably made of an acetal polymer, such as Celcon, which is a non-stick plastic.

The metal cup 68 containing the expansible material 28 usually is made of copper or brass, for rapid heat transfer, but for the present purpose a slow transfer is wanted. For this purpose the cup 68 may be made of stainless steel, and if desired may be coated with a thin layer of a heat-insulating material. This may be a ceramic or a plastic coating, preferably one which may be applied in liquid form and permitted to dry. It is here shown applied at 34 to the inside of the cup 68.

The valve is fixed in position by means of a support ring 72 which rests on a shoulder or step 74, and which is locked against upward movement by the skirt portion 76 of the top 54, the latter in turn being locked in position by the inwardly spun edge 78 of the tube or can 50. The support disc 72 is serrated or peripherally notched or otherwise formed to permit free flow of water. This notching of the periphery may be like that seen in FIG. 5 of the drawing.

Other forms of thermomotive element may be used for the valve, such as a thermostat or an expansible bellows. However, the Vernatherm type of unit provides a much greater force, and is more easily given a delay characteristic.

In FIG. 2 the basket 16 is formed integrally with the supporting ring 18, and the latter is reversely folded or drawn to provide a skirt portion 82. The reservoir 12 is stepped inwardly at 84 and is dimensioned to be received by the annular seat 86 of skirt 82. The latter is stepped inward at 88 and dimensioned to be received by the rolled edge 90 of the server 14. The reservoir 12, the server 14, and the basket 16 may be drawn of sheet metal, typically sheet aluminum.

Referring to FIG. 1, the server 14 has a spout 92 and a handle 94, the latter being made of a heat insulating material, typically a molded plastics material. The reservoir 12 has a cover 96 which preferably is dimensioned to act also as a cover for the server 14 when the reservoir 12 and basket 16 have been removed from the server at the end of the brewing operation. The skirt 82 of the basket may be provided with a detent spring 98, the upper end of which helps hold the reservoir on the basket, and the lower end of which helps hold the basket on the server, thus keeping the parts in assembled relation unless intentionally separated.

A modified coffee maker is illustrated in FIG. 4. The water distribution holes 102 of the spreader 104 are small enough to confine the coffee grounds, but there remains the possibility of lifting the entire spreader; and to prevent this the spreader may be locked against upward movement. For this purpose the basket and spreader are provided with mating detent projections which may vary in form, but in the present case the rim 106 of the basket has a plurality, say three, sloping indents 108 providing an interrupted thread. The spreader 104 is upwardly flanged or cupped at 110, as before, and the part 110 has a corresponding number, in this case three, outwardly struck sloping indents 112. To assemble the parts, the spreader is oriented with the interrupted thread 112 displaced from the interrupted thread 108, and is moved downward and then rotated, thereby tightening their engagement with a screw thread action.

Another difference in the arrangement of FIG. 4 is that there are no side holes through the basket wall 114 for venting. Instead top vents are employed through the spreader 104, as shown at 116. These are inverted cup-like vents, having their lower edges secured to the spreader at 118, and having a vent hole 120 at the top. The vents are made higher than the rim 110 of the spreader, so that water temporarily collected on the spreader will not interfere with the desired venting action. A single vent will suffice, but it is preferred to employ two vents which are diametrically located as shown, because they then serve an additional purpose in facilitating rotation of the spreader relative to the basket when assembling the parts.

Another difference illustrated in FIG. 4 is that in this case the annular support 122 for the basket is separate from the basket, and may be made of a different material, preferably a molded plastics material. The basket 114 here illustrated is made of sheet metal and is outwardly stepped at 124 beneath a rim 106. The body of the basket is dimensioned to slide through the plastic support 122, with the shoulder 124 resting on the inner edge of the support. The outer lower part of the support is shaped and dimensioned at 126 to fit over the rolled upper edge 128 of the coffee server, and the top rim 130 of the support is shaped and dimensioned to receive the stepped bottom part 132 of the reservoir 134. The annular support 122 has large overflow holes 136. The plastic support ring 122 may be provided with a resilient leaf spring 138, the upper end of which acts as a detent to help hold the reservoir 134 in position, and the lower end of which helps hold the ring in position on the server 140.

Another change shown in FIG. 4 is the provision of a plurality, preferably three, feet 111 beneath the bottom wall 115 of the reservoir. These feet provide a means on which the reservoir may be stably rested when removed from the assembly.

The multiple level flow and the valve action in FIG. 4 are the same as previously described. The valve seat and plug are surrounded by a tube or can 142 which houses a thermally responsive delay valve generally designated 144. A flow control orifice 146 is located near the bottom of the reservoir, and an additional passage 148 is located at a higher level to accelerate the flow for larger quantities of water.

According to The Coffee Brewing Institute, Inc., eighteen to twenty-two percent by weight of the original coffee is the permissible or desirable extraction. If under eighteen percent, the brew will be weak, and if over twenty-two percent the brew will be strong and bitter. The percent solids in the finished brew should be between 1.15% and 1.35%. Extraction for the recommended time, and using the appropriate amount of ground coffee, provides this percent of solids.

The dominant and controlling factor in respect to time of extraction is the flow through the flow control orifice 146 (FIG. 4), because the excess is discharged relatively rapidly through the overflow or bypass holes 136. With a small quantity of water, the orifice 146 controls the time from the initial flow. With a large quantity of water, it controls time mainly at the end, that is, after the initial rush of water has reduced the level to the three-cup level at the passage 148. Of course, the quantity of ground coffee is increased for an increased amount of hot water, and the extracted solids are proportionately increased. I have found to my astonishment that even with as much as seventy-five percent of the hot water bypassing the basket, the brewed coffee is of proper strength, because as above stated, the percentage solids extracted depends on time of contact between the hot water and the ground coffee, and not on the quantity of water.

Inasmuch as the extraction time is determined mainly by the bottom flow control orifice, it has been found that the size of the higher level orifice is not at all critical above the needed amount. It may be enlarged greatly, as shown at 148. Indeed, the top closure 150 is not needed at all, but is retained merely to mechanically lock the valve support disc 152 in position. This is largely cut away, as shown at 153 in FIG. 5.

It will be understood that the delay valve may be used even with a coffee maker designed for a substantially fixed quantity of coffee. This is illustrated in FIG. 6, in which the valve plug 154 and seat 156 are surrounded by a riser tube 158 which houses a thermally responsive means 160 which may be like that previously described. There is a flow control orifice 162 at the bottom, but there is no additional higher level passage. In such case a vent tube 164 preferably leads from the top 166 of the tube or can 158 to a level higher than the maximum liquid level in reservoir 168. The large tube 158 could be extended to the top, but it is convenient to reduce its diameter above the valve where a large diameter is no longer needed. In theory it is one tube.

The flow control orifice 162 is designed for a relatively fixed quantity of brew, say six to nine cups, and therefore a single orifice is adequate. Of course, the flow control orifice 162 is larger in diameter than the orifice 52 in FIG. 2 and the orifice 146 in FIG. 4, these being designed to provide the desired brewing time for three cups, whereas orifice 162 is enlarged to provide the desired brewing time for six cups.

The narrowed part 157 of tube 158 is expanded as shown at 159 to receive the hole 162, for easier cleaning of hole 162, and this may be done also in FIGS. 2 and 4.

The structure shown in FIG. 6 is readily modified to again provide a wider capacity range, and referring to FIG. 7, the vent tube 170 is retained and is the same as that shown in FIG. 6, except that an additional flow control passage 172 is provided at the bottom of tube 170. The other change needed would be to reduce somewhat the diameter of the bottom flow control orifice 162 shown in FIG. 6. With these minor changes, the structure may be used for a wider range of say three to nine cups, while retaining the use of a vent tube.

Figure 3:
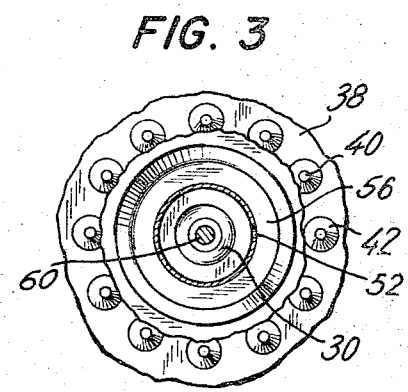
FIG. 3 is a fragmentary horizontal section taken approximately in the plane of the line 3—3 of FIG. 2.

As a specific example of dimensions which may be used for practice of the present invention, assume in FIGS. 2-4 that the reservoir has a diameter of five and one-half inches, with a discharge hole at the bottom having a diameter of 0.250 inch or more. In such case, the lower flow control orifice through the side of the riser tube may have a diameter of 0.110 inch. The upper level hole may have a diameter of 0.156 inch located at the three-cup level. This hole may be larger, or there may be a number of such holes, or the riser tube may be terminated altogether at the three-cup level. With the hole dimensions given above, three cups of hot water will drain from the reservoir in three and three-fourths minutes, and nine cups of hot water will drain from the reservoir in four and one-half minutes. This allows for the added basket drain time, mentioned above.

The spreader is provided with holes having a diameter of 0.039 inch, which is small enough to confine drip grind coffee; and it is provided with thirty-three holes, which is sufficient to pass and yet spread the initial flow received from the reservoir at the start of the brewing cycle, with the minimum quantity (in this case three cups) of water in the reservoir. With a single flow control orifice, as in FIG. 6, there would be forty-five holes in the spreader, for six to nine cups, but the number may be increased to say fifty-five or sixty-five holes, without harm. The flow control orifice 162 may be 0.136 inch in diameter.

Another and different specific example may be given for fine grind coffee. The reservoir had a diameter of about six and one-half inches and was provided with a valve housing or tube which terminated at the three-cup level. There were two diametrically opposed flow control orifices through the side wall of the tube at the bottom of the tube, and they were each 0.120 inch in diameter. The tube had a diameter of 5/8-inch at the orifices. Such an arrangement drains three cups of water from the reservoir in about one and one-half minutes and drains nine cups of water from the reservoir in about two minutes. The extraction time is longer, as above explained.

FIG. 8 shows how the coffee basket 180 may be supported for free overflow to the server 182, without using an annular support with overflow holes as previously described. In this way the basket is supported by a center post or pedestal 184. Inasmuch as the basket 180 is smaller in diameter than the server 182, there is ample space for overflow around the basket.

It will be understood that the dimensions given above are given solely by way of example, and are not intended to be in limitation of the invention.

It is believed that the construction and operation of my improved coffee maker, as well as the advantages thereof, will be understood from the foregoing detailed description. A wide range of capacity is available. The quantity is conveniently measured directly in the reservoir, and premature discharge is prevented by the valve action. After the desired measurement the valve is automatically opened and hot water is supplied to the spreader at a controlled rate to provide a water discharge time which, when added to the residual basket drain time, comes within the range of optimum extraction time for the grind used in the basket. The extraction time is kept within desired small limits despite the wide range of quantity which may be brewed, this being made possible by the multiple level flow control passages, and the overflow holes. When the quantity is large, the flow is accelerated, thereby preventing unduly prolonged extraction time. The excess water overflows and bypasses the basket after flooding the coffee grounds, but the latter are confined in the basket and are prevented from overflow to the server. The resulting limited brewing time assures adequate extraction of coffee solids without the prolonged brewing time which would extract undesirable bitter elements from the coffee.

It will be understood that while I have shown and described the invention in a preferred form, changes may be made without departing from the scope of the invention, as sought to be defined in the following claims. In the claims, the reference to a flow control orifice is not intended to exclude the simultaneous use of several such orifices, as explained and given in one example above.

I claim:

1. A drip brew maker comprising a hot water reservoir, a brew server therebeneath, a basket for the infusion material disposed between the reservoir and the server, said basket having a perforate bottom, a spreader in said basket to receive the flow of hot water, a support for said basket, said basket and spreader and support combination providing means to afford relatively unrestricted overflow of hot water directly to the server, a relatively small flow rate control orifice at the bottom of the reservoir and effective to flow hot water onto the spreader at a desired rate for relatively small quantities of water, an additional relatively large passage leading from the reservoir at a substantially higher level and effective to greately accelerate the flow from the reservoir for quantities of water above said higher level, a valve operable to effectively simultaneously open or close both the orifice and the passage against flow from the reservoir, and a thermally responsive means to open the valve at elevated temperature, whereby said valve when open for larger quantities of water in the reservoir is effective to cause accelerated flow and overflow to the extent needed such that the extraction time for large quantities above said higher level is only a little more than the extraction time for the quantity at said higher level.

2. A brew maker as defined in claim 1, in which the reservoir has a full bottom except for a relatively large flow discharge hole over the spreader, a tube rising from said bottom around the flow discharge hole, said flow control orifice being through the side of the tube at the bottom of the reservoir, said passage being into the tube at a higher level, and said valve being located in said tube and operating on said flow discharge hole in order to be effective against both the orifice and the passage.

3. A drip brew maker as defined in claim 2, in which the flow rate control orifice and the accelerating passage are so dimensioned that the flow from the reservoir is controlled to provide a discharge time which, when added to the residual basket drain time, comes within the range of optimum extraction time for the material contemplated to be used and regardless of any slower rate of flow through the basket, the excess water then bypassing the material in the basket by overflow.

4. A drip brew maker as defined in claim 3, in which the basket is smaller in diameter than the server and is supported by an annular support between the periphery of the basket and the periphery of the server, said annular support having relatively large overflow holes outside the basket.

5. A drip brew maker as defined in claim 4, designed for use with coffee, in which the basket has a volume of 1.6 to 2.5 times the dry volume of the maximum dry coffee charge contemplated to be used in the basket.

6. A drip brew maker as defined in claim 1, in which there is a scale to indicate the quantity of hot water in the reservoir, and in which there is heat insulation means around the thermally responsive means to help cause and insure a desired delay for measurement of hot water being poured into the reservoir during the delay while the valve is still closed.

7. A drip brew maker as defined in claim 2, in which there is a scale to indicate the quantity of hot water in the reservoir, and in which there is heat insulation means around the thermally responsive means to help cause and insure a desired delay for measurement of hot water being poured into the reservoir during the delay while the valve is still closed.

8. A drip brew maker comprising a hot water reservoir, a brew server therebeneath, a basket for the infusion material between the reservoir and the server, a support for said basket, a spreader in said basket, said support and basket being so shaped and designed as to provide means to afford overflow of excess hot water by-passing the material in the basket directly to the server, a scale to indicate the quantity of hot water in the reservoir, said reservoir having a full bottom except for a flow discharge hole over the spreader, a valve to close the flow discharge hole, said valve including thermally responsive means to open the same at elevated temperature but only after a delay regardless of high temperature for measurement of hot water being poured into the reservoir while the valve is still closed, and heat insulation means around the thermally responsive means to help cause and insure the desired delay.

9. A drip brew maker comprising a hot water reservoir, a brew server therebeneath, a basket for the infusion material between the reservoir and the server, a support for said basket, a spreader in said basket, said support and basket being so shaped and designed as to provide means to afford overflow of excess hot water by-passing the material in the basket directly to the server, a scale to indicate the quantity of hot water in the reservoir, said reservoir having a full bottom except for a flow discharge hole over the spreader, a valve to close the flow discharge hole, said valve including thermally responsive means to open the same at elevated temperature but only after a delay regardless of high temperature for measurement of hot water being poured into the reservoir while the valve is still closed, and flow rate control means to control the flow from the reservoir, said flow rate control means being so dimensioned that the flow provides a discharge time from the reservoir which when added to the residual basket drain time, comes within the range of optimum extraction time for the material contemplated to be used, and regardless of any slower rate of flow through the basket, the excess water bypassing the material in the basket by overflow.

10. A drip brew maker comprising a hot water reservoir, a brew server therebeneath, a basket for the infusion material disposed between the reservoir and the server, a support for said basket, a small flow rate control orifice located near the bottom of the reservoir and effective to flow hot water to the basket at a desired rate for a desired extraction time for relatively small quantities of water in the reservoir, and an additional relatively large flow passage located at a substantially higher level in the reservoir and effective to greatly accelerate the flow of hot water for quantities of water above said higher level in the reservoir, whereby the extraction time for larger quantities above said higher level is only a little more than the extraction time for the quantity at said higher level, a valve operable to effectively simultaneously open or close both the orifice and the passage, and a thermally responsive means to open the valve at elevated temperature, the said flow rate control orifice and the said accelerating passage being so dimensioned that the hot water flow from the reservoir when the valve is open is controlled to provide a total discharge time from the reservoir which when added to the residual basket drain time comes within the range of optimum extraction time for the material contemplated to be used, and regardless of quantity within a contemplated wide range of quantity.

References Cited
UNITED STATES PATENTS

| | | | |
|---|---|---|---|
| 203,178 | 4/1878 | Miller | 99—306 |
| 1,276,774 | 8/1918 | Kuhn et al. | 99—311 |
| 1,601,987 | 10/1926 | Topper | 99—311 X |
| 2,143,046 | 1/1939 | Wilcox | 99—306 |
| 2,306,921 | 12/1942 | Wilcox | 99—283 X |
| 2,498,386 | 2/1950 | Alexander | 99—282 |
| 2,767,640 | 10/1956 | Holland | 99—283 |
| 3,011,427 | 12/1961 | Okie | 99—283 |
| 3,194,009 | 7/1965 | Baker | 251—11 X |

WILLIAM I. PRICE, *Primary Examiner.*

WALTER A. SCHEEL, *Examiner.*

S. P. FISHER, *Assistant Examiner.*

UNITED STATES PATENT OFFICE

CERTIFICATE OF CORRECTION

Patent No. 3,333,527                      August 1, 1967

Joseph A. Bender

It is hereby certified that error appears in the above numbered patent requiring correction and that the said Letters Patent should read as corrected below.

In the heading to the drawings, Sheets 1 and 2, line 2 thereof, for "DISPLAY", each occurrence, read -- DELAY --.

Signed and sealed this 11th day of March 1969.

(SEAL)
Attest:

Edward M. Fletcher, Jr.
Attesting Officer

EDWARD J. BRENNER
Commissioner of Patents